US006941435B2

United States Patent
Bonaccio et al.

(10) Patent No.: US 6,941,435 B2
(45) Date of Patent: Sep. 6, 2005

(54) INTEGRATED CIRCUIT HAVING REGISTER CONFIGURATION SETS

(75) Inventors: Anthony R. Bonaccio, Shelburne, VT (US); Robert E. Busch, Essex Junction, VT (US); Barton E. Green, Milton, VT (US); Frank R. Keyser, III, Colchester, VT (US); Troy A. Seman, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 10/248,454

(22) Filed: Jan. 21, 2003

(65) Prior Publication Data

US 2004/0143715 A1 Jul. 22, 2004

(51) Int. Cl.[7] .............................................. G06F 12/00
(52) U.S. Cl. ............................ 711/170; 711/154; 713/1
(58) Field of Search ........................ 711/154, 170–172; 713/1–2

(56) References Cited

U.S. PATENT DOCUMENTS

| 5,297,258 | A | | 3/1994 | Hale et al. |
|---|---|---|---|---|
| 5,555,402 | A | | 9/1996 | Tuma et al. |
| 5,608,869 | A | * | 3/1997 | Hamstra et al. ............. 709/250 |
| 5,659,715 | A | * | 8/1997 | Wu et al. .................... 711/170 |
| 5,675,794 | A | * | 10/1997 | Meredith ....................... 713/1 |
| 5,754,764 | A | * | 5/1998 | Davis et al. ................ 709/200 |
| 6,006,342 | A | | 12/1999 | Beardsley et al. |
| 6,061,750 | A | | 5/2000 | Beardsley et al. |
| 6,081,849 | A | | 6/2000 | Born et al. |
| 6,122,196 | A | | 9/2000 | Tanaka et al. |
| 6,128,717 | A | | 10/2000 | Harrison et al. |
| 6,748,527 | B1 | * | 6/2004 | Utsumi et al. ................ 713/2 |
| 2004/0006671 | A1 | * | 1/2004 | Handgen et al. ............ 711/137 |

* cited by examiner

Primary Examiner—Matthew D. Anderson
(74) Attorney, Agent, or Firm—Richard A. Henkler; Hoffman, Warnick & D'Alessandro LLC

(57) ABSTRACT

An integrated circuit and a method of reconfiguring an integrated circuit in which multiple configuration sets, each including a plurality of register settings, are stored on the chip. Selection of at least a portion of a configuration set allows for quicker and easier retrieval and loading of register settings, and reduces the complexity and size of the higher level system control program. In an alternative embodiment, at least a portion of a configuration set that is stored on the chip can be directly loaded to at least one device to be controlled to eliminate the need for the set of registers.

20 Claims, 4 Drawing Sheets

INTEGRATED CIRCUIT HAVING REGISTER CONFIGURATION SETS

BACKGROUND OF INVENTION

1. Technical Field

The present invention relates generally to integrated circuits, and more particularly, to integrated circuits having a plurality of register configuration sets.

2. Related Art

Many integrated circuits (ICs) offer the user ways of configuring the function of the chip. There are several techniques available to do this, but for medium-to high-complexity devices, one of the most common techniques uses on-chip registers to store specific setting values which program specific characteristics. For example, in a hard disk drive (HDD) read channel, 01x in register D4x might mean, set the internal filter 3 dB frequency to 218.5 MHz. Alternatively, in a microprocessor, a value of 01x in register D4x might mean, turn off the instruction prefetch in low power mode.

The number of programmable registers is determined by the number of bits used for addressing the register space. For example, if 8 bits are permitted for addressing, there can be 256 individually addressable registers. The size of each register can be arbitrarily set. For example, referring to FIG. 1, parts of a typical HDD read channel IC 10 are shown. A typical HDD read channel, uses 8 bit registers at each address. Accordingly, there are 8×256=2048 individually adjustable register bits. These registers 12 are indicated as 00 to FF in register memory 11. The registers 12 are often implemented as latches and placed along with the rest of the functional logic using application specific IC (ASIC) standard cell library elements. Because the contents of the registers are used during normal operation of the chip—particularly to control sensitive continuous time analog circuits—the values of all registers must be available on dedicated wire buses at all times.

With continuing reference to FIG. 1, the setting values stored in the registers can come from a number of places. First, the latches in the registers are designed to reliably reset to a specific state when power is first applied to IC 10. For example, 0 or 1, depending on the reset condition desired for the circuit being controlled by that register. Because these values are designed in for each bit in each register, there is, in some sense, a memory 14 to contain this power-on reset (POR) value information. Second, once the chip is powered up and operating normally, the setting values in the registers can be set from an external source of configuration data 30 via primary pins on the IC, often in a serial fashion via a serial access port 16 to reduce the number of pins required. A typical serial port transaction would use one pin (ENA) to signal enable; another pin (DATA) to signal information in the form of $n_a$ bits of address, $n_a$ bits of data, and 1 bit of direction (read or write); and a third pin (CLK) to act as a strobe or clock. Third, register setting values can also be generated by internal engines on IC 10. For example, as shown in FIG. 1, some ICs include an internal calibration engine 18 for analog circuits and/or an internal hardware optimization engine 20.

In some applications, the register configuration settings must be changed frequently because the conditions of the application change. One exemplary application where this occurs is hard disk drives. In this example, the HDD read channel IC must be reconfigured by the hard disk controller (HDC), i.e., the external source 30, every time the HDD head is moved from zone to zone on the disk. Sets of register configuration settings are normally stored with the HDC, which initializes them from the disk when the system is powered on. However, the HDC and the read channel are normally not integrated on the same chip. Accordingly, each and every register load necessitates a serial port transaction. Consequently, modifying register settings takes time and energy, and reduces overall system performance. Furthermore, functions for modifying register settings must be written into the higher level system control program (i.e., microcode or firmware) in the application system, e.g., the HDC, which increases the size and complexity of the code.

In view of the foregoing, there is a need in the art for a less complex, quicker and more efficient way to reconfigure an integrated circuit.

SUMMARY OF INVENTION

The invention provides an integrated circuit and a method of reconfiguring an integrated circuit in which multiple configuration sets, each including a plurality of register settings, are stored on the chip. Selection of at least a portion of a configuration set allows for easier, quicker and more efficient retrieval and loading of register settings, and reduces the complexity and size of the higher level system control program. In an alternative embodiment, at least a portion of a configuration set that is stored on the chip can be directly loaded to at least one device to be controlled to eliminate the need for the set of registers.

A first aspect of the invention is directed to an integrated circuit (IC) comprising: a set of registers for controlling actions of the IC; memory for storing multiple configuration sets, each configuration set including a setting for a plurality of the registers; and means for implementing at least a portion of a configuration set into corresponding registers.

A second aspect of the invention is directed to an integrated circuit (IC) comprising: a set of registers for controlling actions of the IC; memory for storing multiple configuration sets, each configuration set including a setting for a plurality of the registers; and a state machine for implementing at least a portion of a configuration set into corresponding registers.

A third aspect of the invention is directed to a method of reconfiguring an integrated circuit (IC) having a set of registers for controlling action of the IC, the method comprising the steps of: storing multiple configuration sets, each configuration set including a setting for a plurality of the registers; and implementing at least a portion of a configuration set into corresponding registers.

A fourth aspect of the invention is directed to an integrated circuit (IC) comprising: memory for storing multiple configuration sets, each configuration set including a plurality of settings for controlling at least one device; and means for implementing at least a portion of a configuration set into the at least one device.

The foregoing and other features of the invention will be apparent from the following more particular description of embodiments of the invention.

BRIEF DESCRIPTION OF DRAWINGS

The embodiments of this invention will be described in detail, with reference to the following figures, wherein like designations denote like elements, and wherein.

DETAILED DESCRIPTION

For overall ease of description, the invention will be explained relative to a HDD read channel application. However, the invention finds application relative to practically any IC configured by registers and, accordingly, the teachings of the invention should not be limited to the particular application disclosed.

Figure 2:
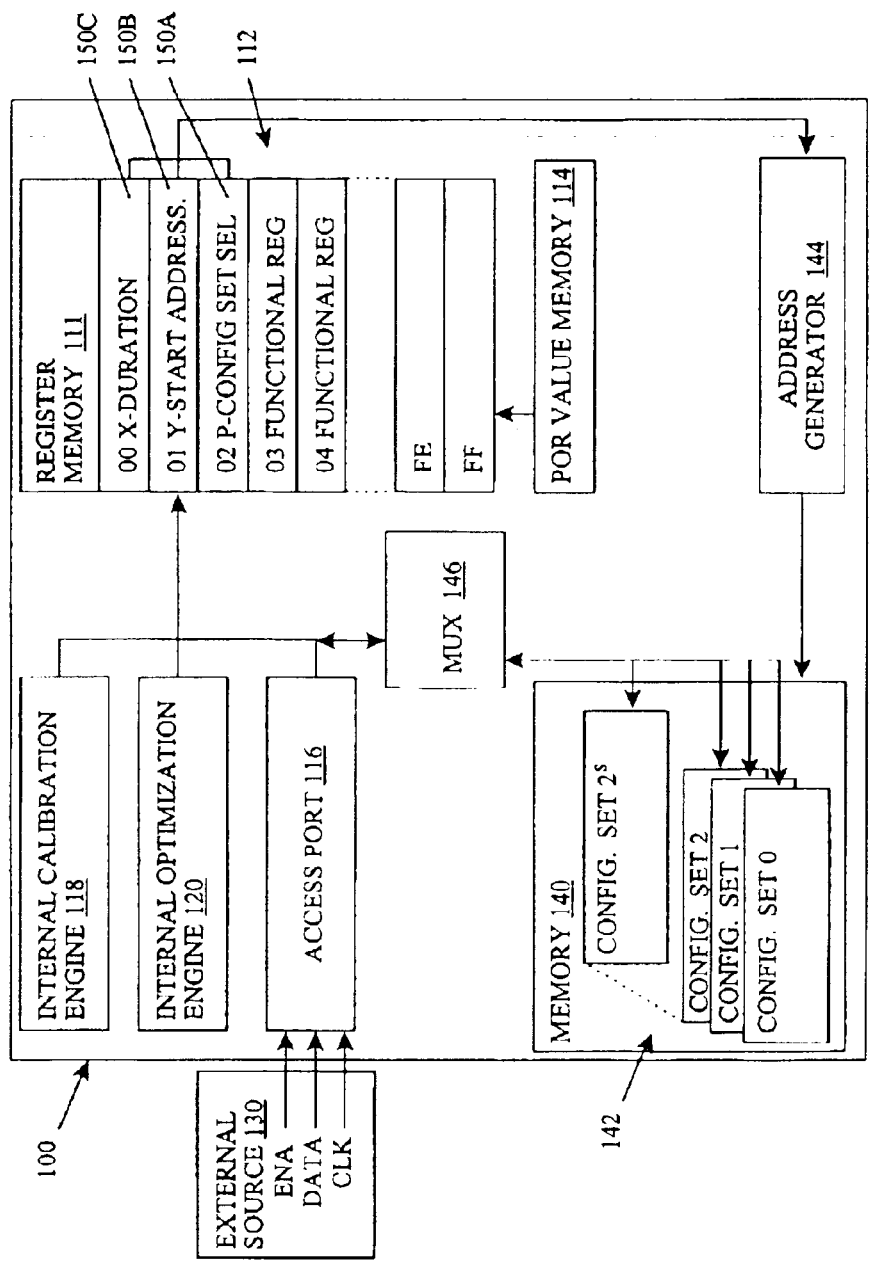
FIG. 2 shows a block diagram of parts of an IC that includes multiple configuration sets.

Referring to FIG. 2, parts of an integrated circuit 100 of the invention are shown. It should be recognized that much of the operational structure of IC 100 has been omitted for clarity and because the actual structure will vary depending on application. In terms of the invention, IC 100 includes a set of registers 112 for controlling actions of IC 100, a memory 140 for storing multiple configuration sets 142 and an address generator 144. The set of registers 112 is stored in a register memory 111. Communication between an external source(s) of configuration data 130, memory 140, address generator 144 and register memory 111 is implemented via a bidirectional multiplexor (MUX) 146.

Figure 1:
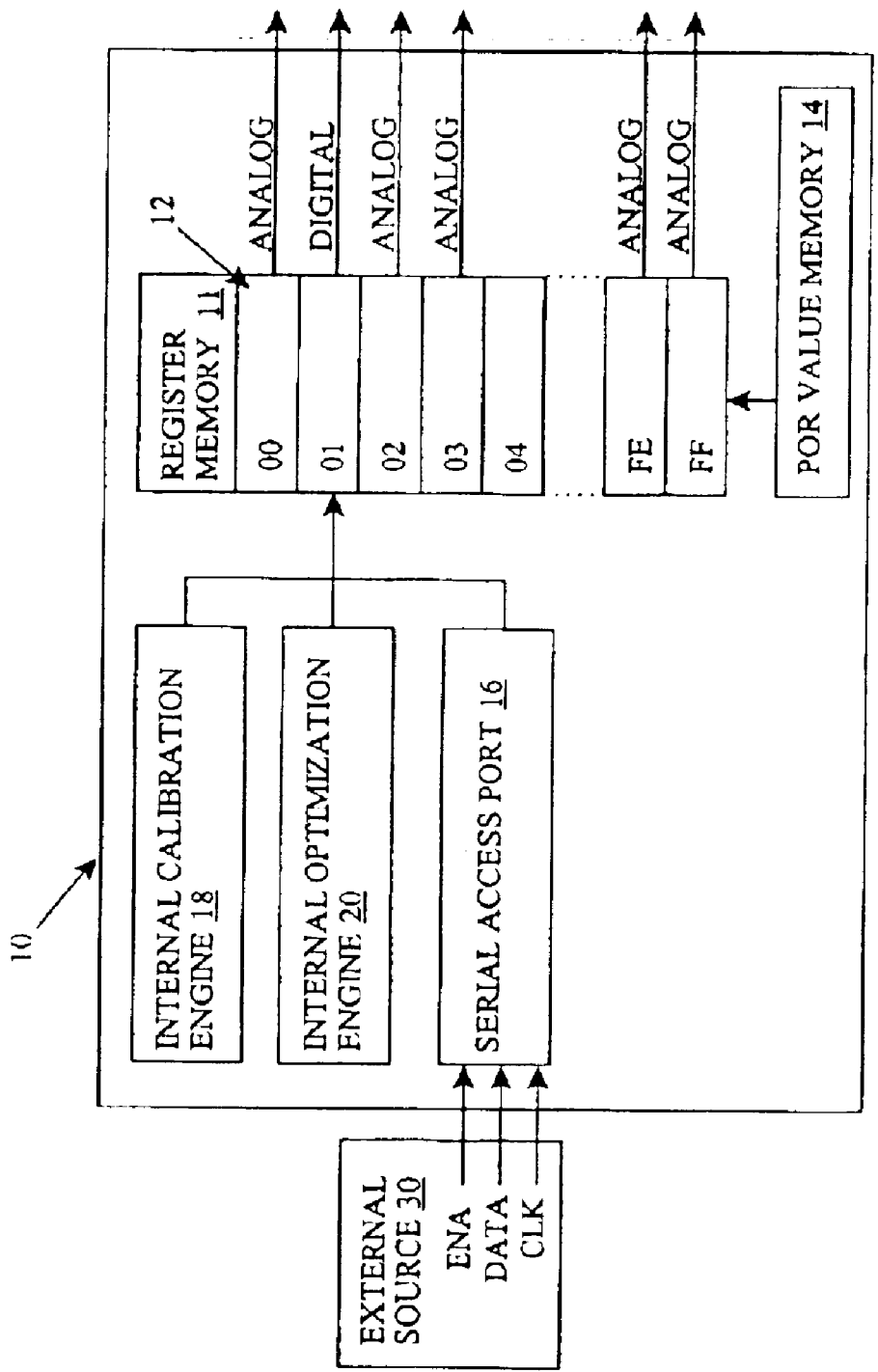
FIG. 1 shows a block diagram of register components of a prior art IC.

IC 100 may also include other standard structure as described relative to FIG. 1. For example, IC 100 may include memory 114 for storing default or power-on initialization settings for the set of registers 112, an access port 116 for communication with external source(s) 130 such as a hard disk controller (i.e., using the three pins ENA, DATA and CLK), an internal calibration engine 118 and an internal optimization engine 120. Other processing units which read (or write) settings to (or from) register memory 111 can be envisioned depending on the function of IC 100. Access port 116 can be implemented as any now known (e.g., serial, parallel, wireless or optical) or later developed data port.

Each configuration set 142 includes a setting for a plurality of the registers 112. At least one configuration set 142 may include a number of settings less than a number of registers in the set of registers 112. In FIG. 2, the discrete configuration sets are shown for clarity. It should be recognized, however, that the concept of discrete configuration sets 142 in memory 140 may be replaced by the well-known offset pointer approach. Memory 140 is organized as a single-port structure with $2^s$ sets, where s is the number of set address bits. Each configuration set 142 contains at most $2^n$ words of m bits each, where n is the number of bits in the configuration set register address and m is the number of bits in each register. In the example given relative to FIG. 1, m and n were both 8. Each configuration set 142 in memory 140 contains one optimized configuration setting for the system. So, for an 8-bit address space (256 registers) with 8-bit registers, 4 set address bits would permit 16 different configurations and require 32668 bits of memory 140.

Memory 140 can be any form of IC storage, i.e., generic non-volatile or volatile. In one embodiment, memory 140 may be dynamic random access memory (DRAM) or static random access memory (SRAM). In an alternative embodiment, memory 140 can be non-volatile flash or programmable read only memory (PROM). However, memory 140 is not required to be flash or PROM if some other form of non-volatile storage is available to IC 100 as is typically the case. For example, in a hard disk drive, enough register information to initialize the read channel, and read data from certain easy portions of the disk, is stored in a boot flash. Remaining register information may be stored in a reserved area on the disk itself.

Address generator 144 implements at least a portion of a configuration set into corresponding registers 112. Implement includes, inter alia, retrieving at least a portion of a configuration set and loading the portion into the set of registers 112. In one embodiment, address generator 144 is controlled by a group of registers 150, referred to collectively as configuration registers, within the set of registers 112. Configuration registers 150 may include a trigger register 150A, a start address register 150B and a duration register 150C.

With regard to the trigger designation, a number of registers in register memory 111 are designated as trigger registers because any time a new value is written into one, IC 100 automatically executes an action using the value of that register. For example, writing 00x to a specific trigger register might cause a calibration action to be executed, and as a result of this action the values of other registers may be updated after the clock cycles it might take to complete the action. This is in contrast to a non-trigger register which simply holds an m-bit value that is statically available to the circuit which it controls. Start register 150B and duration register 150C are these type registers.

For this invention, start register 150B designates a start address Y at which to start retrieving settings within the configuration set, and duration register 150C designates how many settings X to retrieve from within the configuration set. Trigger register 150A designates which configuration set (P) is to be used and activates implementation of the settings of the configuration set by address generator 144 to an appropriate plurality of the set of registers 112. In operation, the action of loading a new value into trigger register 150A causes address generator 144 to generate addresses for memory 140 starting at address Y and continuing for X number of addresses.

A specific bit or bits in trigger register 150A might be set to a given value which would indicate Configuration in Progress during the interval in which address generator 144 is active. In this way, trigger register 150A can be polled by external source 130 or other IC mechanisms, e.g., engines 118, 120, to determine whether the configuration operation has completed and/or completed successfully. The addresses of configuration registers 150 are chosen so as to permit address generator 144 to avoid refreshing these registers during a configuration operation. Presumably this would mean putting configuration registers 150 at the beginning or end of the register memory 111 space, and starting or ending the address generation at an appropriate auxiliary offset. Hence, address generator 144 never starts at an address less than 2 (suitably adjusted for page table offset) to prevent overwriting these values during a configuration.

Figure 3:
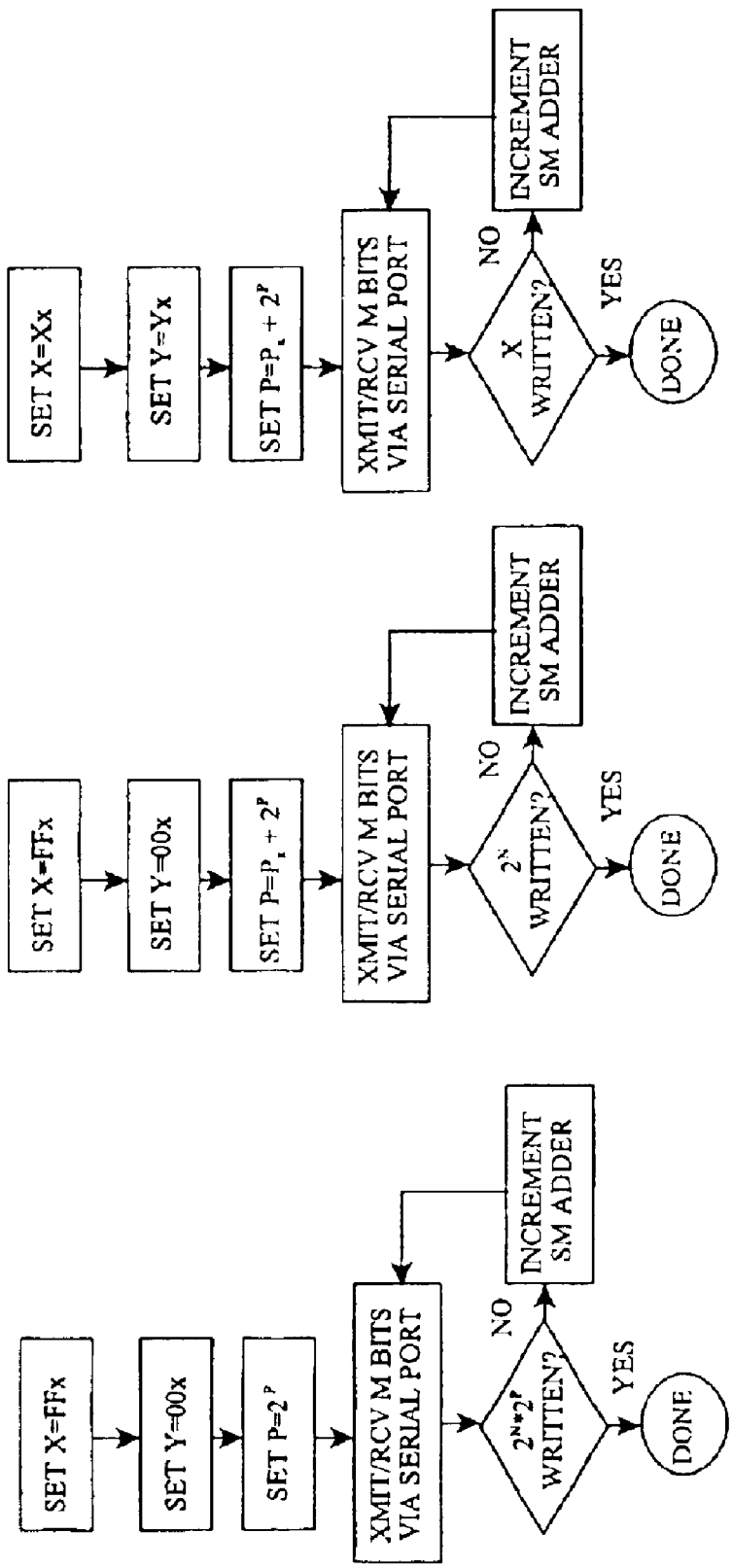
FIGS. 3A–C show flow diagrams of initialization methodology for the IC of FIG. 2.

In terms of configuration set initialization, three scenarios are envisioned: initialize all configuration sets, initialize or replace a single configuration set, or initialize selected parts of a configuration set. In either scenario, configuration sets 142 or parts thereof are loaded into memory 140 from external source 130 via access port 116 during system power-up. Address generator 144 directs loading of data into memory 140. The source of configuration set 142 data would be a nonvolatile memory element (i.e. flash or disk as in the example above) or some algorithmic calculation located elsewhere in the system, e.g., external source 130, calibration engine 118, internal optimization engine 120, etc. Referring to FIGS. 3A–C, flow diagrams of various procedures for initializing memory 140 are shown. These flow diagrams assume that the number of configuration sets 142 is small enough so that there are extra bits in the machine register 150A that can be used to control the initialization operation. Initialization mode is determined by the settings in configuration registers 150. In particular, a start address Y setting is written to register 150B and an address number to be loaded is written to duration register 150C. A trigger setting P, which is set to a value out of its normal range, is also written to trigger register 150A which directs address generator 144 to generate addresses for the data as it is loaded via mux 146.

FIG. 3A shows a process in which all bits in memory 140 (FIG. 2) are initialized. For maximum efficiency, it is envisioned that only the data is transmitted across access port 116 (FIG. 2) when data is transferred from external source 130 (FIG. 2). As previously described, "m" represents the number of bits of data contained in a single register location having a unique address. Each time m bits is received, the information is transferred as m bits in parallel to memory 140 and the address is incremented. This is repeated until the entire memory 140 is initialized. In the process shown in FIG. 3B, only a single configuration set 142 (FIG. 2) is initialized by terminating the address incrementing after $2^n$ addresses are written, where 'n' is the number of bits in the address of each register. In FIG. 3C, a subset of a configuration set 142 (FIG. 2) is written by setting X and Y to values other than their defaults.

In operation, multiple configuration sets 142 are stored in memory 140, as described above. A particular configuration set 142 is selected by external source 130 sending a configuration selection setting P to machine trigger register 150A via access port 116. Alternatively, internal engines 118, 120 may also call for a particular configuration set. Address generator 144 can generate X sequential addresses, beginning at an offset of $2^{PO}+Y$, where PO is the desired configuration set; and X and Y are values which default to $2^n-1$ and 0, respectively. By appropriate selection of X and Y at registers 150C and 150B, address generator 144 can generate addresses that point to any configuration set or sequential subset of a configuration set in memory 140. By default, $2^n$ unique addresses (X) are generated beginning at an offset (Y) of $2^{PO}$, where 'n' is the number of bits in the register address.

In each clock cycle, an access into the addressed word in memory 140 is performed and the contents placed on the memory's I/O port. subsequently, this data is placed on the data bus for register memory 111 by mux 146, and a non-off value the appropriate address associated with that data is placed on the address bus for register memory 111. Which of the set of registers 112 is appropriate may be determined by the particular configuration set 142 selected. In this way, in the $2^n$ clock cycles, the entire device register memory 111 is loaded with the contents of configuration set 142 from memory 140. If X and Y have been set to non-default values, a similar operation would occur but only X sequential device registers would be reloaded from addresses $2^{PO}+X+Y$ in the storage array.

Once at least a portion of a configuration set has been implemented, external source 130 (or engines 118, 120) may direct that a different portion of possibly a different configuration set can be implemented as well. In this way, portions of different configuration sets can be simultaneously implemented, which provides increased customization.

Additional customization is possible where only a portion of trigger register 150A is used for the above-described functions. In particular, where only a portion of trigger register 150A is used, it is possible to write a setting to the unused portion to direct address generator 144 to write back (saving) register memory 111 or a part thereof into configuration set memory 140. This function allows saving a new configuration set that has been generated, perhaps by numerous mechanisms such as external source 130, engines 118, 120, etc., described above. This further customization allows saving of a new configuration set 142 for restoration at a later time.

Figure 4:
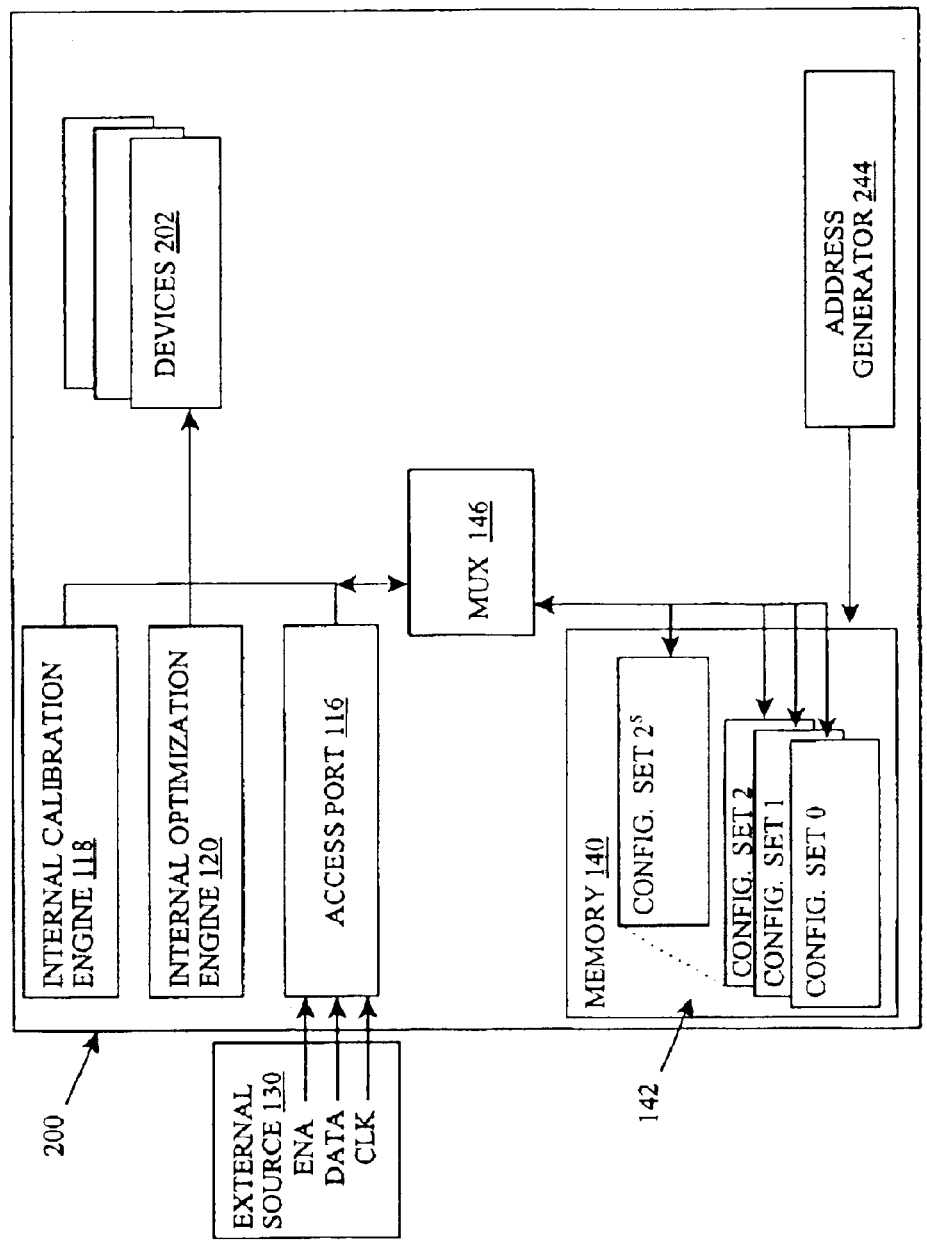
FIG. 4 shows a block diagram of an alternative embodiment of parts of an IC that includes multiple configuration sets.

Referring to FIG. 4, a block diagram illustrating an alternative embodiment of parts of an integrated circuit 200 of the invention is shown. As with FIG. 2, it should be recognized that much of the operational structure of IC 200 has been omitted for clarity and because the actual structure will vary depending on application. In terms of the invention, IC 200 is substantially the same as IC 100 of FIG. 2. However, in this embodiment, the associated outputs, i.e., lines labeled analog or digital in FIG. 1, that communicate directly with devices (not shown) to be controlled are coupled to multiplexor 146 and the set of registers are removed. At least a portion of a configuration set 142 is then implemented directly to at least one device (not shown) by address generator 244. Address generator 244, in this case, may be controlled by a group of settings within a configuration set. In this setting, implement includes, inter alia, retrieving at least a portion of a configuration set and loading it into at least one device. This configuration of components is advantageous where, for example, entire configuration sets 142 are desired to be used at any one given time. In this setting, memory 140 is loaded according to the process shown in FIG. 3A and address generator 244 is configured to deliver "register" values directly to the appropriate device (s) to be controlled, which eliminates the need for the set of registers.

In the previous discussion, it will be understood that the method steps discussed are performed by hardware contained within IC 100, 200. However, it is understood that the various devices, modules, mechanisms and systems described herein may be realized in hardware or software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. An integrated circuit (IC) comprising:
    a set of registers for controlling actions of the IC;
    memory separate from the set of registers for storing multiple configuration sets, each configuration set including setting for a plurality of the registers; and
    means for implementing at least a portion of a configuration set into corresponding registers, wherein the means for implementing saves the settings from the set of registers in the memory.

2. The IC of claim 1, further comprising memory for storing initialization settings for the set of registers.

3. The IC of claim 1, further comprising means for communicating between the set of registers, the memory, the means for implementing and an external source of configuration data.

4. An integrated circuit (IC) comprising:
    a set of registers for controlling actions of the IC;
    memory separate from the set of registers for storing multiple configuration sets, each configuration set including setting for a plurality of the registers, wherein at least one configuration set includes a number of settings less than a number of registers in the set of resisters; and
    an address generator for implementing at least a portion of a configuration set into corresponding registers.

5. The IC of claim 4, wherein the address generator is controlled by a group of configuration registers within the set of registers.

6. The IC of claim 5, wherein the group of configuration registers includes:
    a trigger register that designates which configuration set is to be used and implements loading of the settings from the configuration set to the set of registers;
    a start register that designates an address at which to start retrieving settings within the configuration set; and
    a duration register that designates how many settings to retrieve from within the configuration set.

7. The IC of claim 6, wherein the trigger register also implements a saving of the settings from the set of registers to the memory.

8. The IC of claim 4, further comprising a memory for storing initialization settings for the set of registers.

9. The IC of claim 4, wherein the address generator directs loading of the multiple configuration sets into memory.

10. The IC of claim 4, further comprising a multiplexor for communicating between the set of registers, the memory, the address generator and an external source of configuration data.

11. A method of reconfiguring an integrated circuit (IC) having a set of registers for controlling action of the IC, the method comprising the steps of:
    storing multiple configuration sets separately from the set of registers, each configuration set including a setting for a plurality of the registers, wherein at least one configuration set includes a number of settings less than a number of registers in the set of registers; and
    implementing at least a portion of a configuration set into corresponding registers.

12. The method of claim 11, further comprising the step of providing a group of configuration registers within the set of registers to control the step of implementing.

13. The method of claim 11, wherein the step of implementing includes:
    designating which configuration set is to be used;
    designating an address at which to start retrieving settings within the configuration set; and
    designating a duration of how many settings to retrieve from within the configuration set.

14. The method of claim 13, further comprising the step of saving the settings from the set of registers.

15. The method of claim 11, further comprising the step of storing initialization settings for the set of registers.

16. The method of claim 11, wherein the step of storing includes loading the multiple configuration sets into the memory upon initialization of the IC.

17. The method of claim 11, wherein the step of implementing includes communicating between the set of registers, the memory, the address generator and an external source of configuration data using a multiplexor.

18. An integrated circuit (IC) comprising:
    memory for storing multiple configuration sets, each configuration set including a plurality of settings for controlling at least one device; wherein the multiple configuration sets are separate from the at least one device, and at least one configuration set includes a number of settings less than a number of registers in a set of registers; and
    means for implementing at least a portion of a configuration set into the at least one device.

19. The IC of claim 18, further comprising means for communicating between the memory, the means for implementing and an external source of configuration data.

20. The IC of claim 18, further comprising an address generator controlled by a group of settings within a configuration set.

* * * * *

UNITED STATES PATENT AND TRADEMARK OFFICE
CERTIFICATE OF CORRECTION

PATENT NO. : 6,941,435 B2
DATED : September 6, 2005
INVENTOR(S) : Bonaccio et al.

It is certified that error appears in the above-identified patent and that said Letters Patent is hereby corrected as shown below:

Column 7,
Lines 11 and 26, please insert an -- a -- after the word "including".

Signed and Sealed this

Twenty-second Day of November, 2005

JON W. DUDAS
*Director of the United States Patent and Trademark Office*